(12) United States Patent
Reuteler (10) Patent No.: US 7,858,011 B2
(45) Date of Patent: Dec. 28, 2010

(54) METHOD AND APPARATUS FOR PRODUCING A RIM

(75) Inventor: Andreas Reuteler, Biel/Bienne (CH)

(73) Assignee: DT Swiss Inc., Grand Junction, CO (US)

( * ) Notice: Subject to any disclaimer, the term of this patent is extended or adjusted under 35 U.S.C. 154(b) by 169 days.

(21) Appl. No.: 12/109,127

(22) Filed: Apr. 24, 2008

(65) Prior Publication Data

US 2008/0265657 A1    Oct. 30, 2008

(30) Foreign Application Priority Data

Apr. 24, 2007 (DE) ................ 10 2007 019 587

(51) Int. Cl.
*B29D 30/00* (2006.01)
(52) U.S. Cl. ............... 264/258; 264/501; 264/315; 264/326; 425/28.1; 425/48
(58) Field of Classification Search ........... 264/258, 264/501, 315, 326; 425/28.1, 48
See application file for complete search history.

(56) References Cited

U.S. PATENT DOCUMENTS

| | | | | |
|---|---|---|---|---|
| 3,265,800 | A | * | 8/1966 | Trunk ............... 264/328.16 |
| 4,331,735 | A | * | 5/1982 | Shanoski ............ 428/423.7 |
| 4,575,447 | A | * | 3/1986 | Hariguchi ............ 264/516 |
| 5,184,874 | A | * | 2/1993 | Olson et al. ........... 301/64.705 |
| 5,234,259 | A | * | 8/1993 | Nishimuro et al. ..... 301/64.701 |
| 5,549,360 | A | | 8/1996 | Lipeles |
| 5,975,645 | A | | 11/1999 | Sargent |
| 6,347,839 | B1 | | 2/2002 | Lew et al. |
| 6,761,847 | B2 | * | 7/2004 | Meggiolan ............ 264/257 |
| 6,991,300 | B2 | * | 1/2006 | Colegrove ........... 301/95.103 |
| 2004/0021366 | A1 | | 2/2004 | Colegrove |
| 2005/0062337 | A1 | * | 3/2005 | Meggiolan et al. ..... 301/95.102 |

FOREIGN PATENT DOCUMENTS

| | | |
|---|---|---|
| EP | 1 231 077 A2 | 8/2002 |
| EP | 1 386 756 A2 | 2/2004 |
| EP | 1 506 882 A1 | 2/2005 |
| EP | 1 231 077 B1 | 5/2006 |

* cited by examiner

*Primary Examiner*—Khanh Nguyen
*Assistant Examiner*—Saeed M Huda
(74) *Attorney, Agent, or Firm*—Greer, Burns & Crain, Ltd.

(57) ABSTRACT

A method of producing a bicycle rim including, positioning a first quantity of woven fiber strips having a first width and a first length and a second quantity of strips of said woven fibers having a shape different from the first shape to form a first laminated band from the first quantity and the second quantity of strips. A second narrower laminated band is produced. The first band is re-shaped to a V-shaped band before the first band is inserted along the periphery of a mold interior. A core is positioned on the first band and the second band is positioned on the first band. Rim well rings are positioned from outside on the second band, to abut the sides of the second band. A spreader ring is inserted between the rings to join the material near the upper rim flanks and the rim flanges.

21 Claims, 6 Drawing Sheets

METHOD AND APPARATUS FOR PRODUCING A RIM

BACKGROUND

The invention relates to a method and an apparatus for producing a rim, and a rim produced using said method and provided in particular for bicycles and the like.

In the field of amateurs and in professional cycling, the stress tolerance and the weight of the components are a decisive factor since the users set great store by high-quality, lightweight components. One aspect of importance includes in particular the component quality.

To reduce the weight of bicycle rims, rims of fiber-reinforced plastics have become known for which while their total weight is reduced the stability achieved is comparable to that of metal rims.

Thus, for example EP 1 231 077 B1 has disclosed a method for producing a rim for a bicycle and an apparatus for producing a rim according to which, to produce a hollow rim, a specific quantity of layers of a structural woven fiber which includes a plastic matrix, are successively, one by one applied on the inner part of a mold. The applied, predetermined quantity of layers forms the inner wall, the outer wall, the two side walls, and the load-bearing areas of the rim. Subsequently an inflatable bag is applied on the layers. The inflatable bag is inflated slightly to assume its provided volume. Subsequently a quantity of layers namely, a first predetermined quantity of layers is folded back directly on the slightly inflated bag and folded on said bag such that the bag is entirely, on all sides enclosed by said first, predetermined quantity of layers. Subsequently a core is applied on the folded back layers. The core has a high coefficient of thermal expansion for exerting pressure on the layers at the increased curing temperature. Then the remaining layers, i.e. a second predetermined quantity of layers is folded directly on the core. Then the mold is closed by means of an outer part and the slightly inflated bag is inflated with air to its full operating pressure to press the layers against the mold. Then the mold is heated up to an increased temperature which is sufficient to generate reticulation of the plastic matrix. The bicycle rim is demolded and the core is then removed. The protruding rim flanges are trimmed and in a subsequent mechanical machining step given the desired shape.

A drawback of the known method is that the layers are placed in the mold one by one and thus the reproducibility of the production method is limited. Another drawback is that the particularly stress-loaded points in the rim base where as a rule the spokes are attached, the material thickness is low while in other places it is larger than necessary. The known rims provide for a uniform wall thickness over the whole area of the rim base.

Therefore it is the object of the present invention to provide a different method for producing a bicycle rim which allows to provide a higher reproducibility and in which the rim base can have various and in particular increased wall thicknesses.

SUMMARY

In the method according to the invention of producing a rim which is in particular suitable to be employed in a bicycle, said method serves to produce a rim comprising a rim well, a rim base, lateral rim flanks and rim flanges between which a wire tire can be received. The method according to the invention comprises the following steps in the order indicated or in any other suitable sequence:

Positioning at least a first quantity of strips of a woven-fiber including material on a separate support which first quantity of strips comprises a first width, a first length, and a first shape. Subsequently at least a second quantity of strips of the woven-fiber including material is positioned on the support which second quantity of strips has a shape different from the shape of the first strips, to thus form from the first quantity and at least the second quantity of strips, a first multi-layer laminated band. The length of the second strips substantially corresponds in particular to the length of the first strips.

A second multi-layer laminated band is produced which is narrower than the first laminated band wherein in particular uniform strips are employed. The resin serving as the matrix material can be applied on both laminated bands by means of a brush or the like and spread by means of a roller.

The e.g. substantially flat-lying, first laminated band is re-shaped into a V-shaped laminated band. Re-shaping may occur by means of a roller device or a conversion press which pre-folds the flat-lying laminated band in particular on-center.

Thereafter the V-shaped, first laminated band is inserted along or on the periphery of the inner part of a basic mold wherein an approximately V-shaped groove is provided over the mold periphery which serves as the mold for producing the rim and which in particular corresponds to the outer profile of the rim to be produced.

After positioning the V-shaped, first laminated band in the basic mold, a core is positioned on the first laminated band in the basic mold. The core extends in particular over the entire periphery of the basic mold.

The second laminated band is positioned on the core to form the rim well and part of the wall thickness of the rim flanks in particular in the region of the rim flanges.

This is followed by positioning a first, substantially annular rim well ring on the second laminated band. Preferably a second, again substantially annular rim well ring is also positioned on the second laminated band. Both rim well rings are in lateral contact in particular with the second laminated band. A spreader ring in particular in the shape of a wedge between the two rim well rings advantageously serves for spreading the rim well rings apart. The insides of the rim flanks are formed by the second laminated band while the outsides are formed by the first laminated band. The region of the rim flanks is pressure-bonded by means of the spreader ring and the rim well rings such that the layers provided there are subjected to pressure during curing.

After applying an outer ring the mold is heated and temperature-controlled for a predetermined duration at predetermined temperature conditions to ensure curing of the rim which occurs in particular by way of reticulation or fusing of the matrix material.

Finally the rim is de-molded, in particular after both the mold and the rim have cooled.

The invention has many advantages. The positioning of a first quantity of strips of a woven-fiber including material on a separate and in particular plane support allows a highly reproducible process since the strips can be prefabricated as desired and then in principle ideally layered on the support. There is for example provided a limit stop to align the individual strips relative to one another.

Forming the laminated band may be automated in that the layers are stacked mechanically which can reduce costs considerably since the production of conventional rims of fiber-reinforced materials includes a very high proportion of manual labor. Furthermore one can achieve precision in producing the laminated band.

At least a second quantity of strips of the woven-fiber including material is positioned on the support or on the first quantity of strips of the woven-fiber including material. The second quantity of strips and the first quantity of strips are different in shape and/or width but in particular equal in length.

For example the second quantity of strips may serve to reinforce the spoke holes, comprising at the positions provided for said spoke holes reinforcing rings interconnected only by narrow strips or threads. Positioning the strips may occur by way of a coordination of angles since the spot intended for the rim valve hole allows precise positioning.

In addition to or instead of one or more strips for reinforcing the spoke holes it is also preferred to employ still narrower strips for reinforcing the rim base.

By way of these process steps one obtains a prefabricated first, multi-layer laminated band which may be individually adapted to particular requirements. Each of the first and the second quantities of strips may be equal to or larger than one. The first laminated band in particular comprises two, three, four, five, or more strips.

In this way one can increase the wall thickness in particular in the rim base area by means of additional, narrower strips to thus increase the rim base stability since this is where as a rule the spoke or the spoke nipples are attached. To this end it is particularly preferred to provide reinforcement for the spoke holes by means of at least one strip which forms reinforcements at the spoke holes while the reinforcement strips between the spoke holes comprise a small amount of material only. Thus the rim is reinforced in the pertinent places only.

Before positioning the core in the mold it is conceivable for the core to be first wrapped in a fabric layer on a plane support or covered in a fabric hose. In this way, further reinforcing layers may be applied on the core, in particular for reinforcing the rim base. Applying the layers external of the mold allows to achieve a reproducible arrangement of the reinforcing layers.

The core may consist e.g. of a eutectic metal that can be re-melted by increasing the temperature accordingly to thus remove the core from the rim after curing. To prevent that the eutectic metal mingles with other materials, the core is preferably coated in a suitable protective coating which is removed through the valve hole after the rim production is finished. Since the metal employed for the core is recycled, it is subsequently brought back to its intended shape in a core mold.

It is also preferred to employ a core e.g. of a water-soluble material that is flushed out after curing to not leave the core in the rim. For this purpose the core may be wrapped in a film into which after curing water or another suitable solvent is introduced to dissolve and flush out the core. Subsequently the film is removed out of the rim. Another possibility is, to provide a core e.g. of plastic foam or polystyrene foam which due to its low weight may remain in the rim. Or else, the core is provided with a protective coating before use and flushed out by means of a solvent.

Another preferred option is to use at least one core filled with a liquid fluid. The core is in particular filled with water or oil or the like and connected with a pressure-compensating valve to equalize the pressure while heating the mold. After curing, the fluid can then be sucked out of the core residue-free and the core case removed such that no additional weight will remain in the rim.

Other embodiments provide for a slack bag to be placed in the mold. A firm core is then inserted above said slack bag which core is enclosed e.g. in a fabric layer or a fabric hose. The web thus formed serves to reinforce the rim sideways. In this way one obtains, together with the transverse web defined by the rim well, a double, lateral reinforcement to thus better absorb and transfer the high braking forces. It is another considerable advantage of such a configuration that better fatigue strength is provided against the bending moments exerted on the rim flanges by the high internal tire pressure.

In production, reinforcement fibers and/or reinforcement layers may be inserted as necessary after positioning the first laminated band in the mold. Thereafter a slack bag is inserted which is filled up only after closing the mold to press the reinforcement layers against the mold.

Above the bag, which is still slack, the laminated band is inserted into the mold which is so dimensioned in length that the layers of the first laminated band and of the second laminated band lie flush with the rim flanges. In this way precise positioning is possible even without a firm core. The layers of the second laminated band form the rim well of the rim. After inserting the laminated band, the rim well rings and the spreader ring are inserted.

Generally speaking, two separate, lateral connecting webs between the two side or braking flanks offer many advantages since the stress tolerance of the rim increases.

Another preferred configuration is one in which a core is provided at the rim base which radially outwardly is followed by a fabric hose in which one more core or a fillable, slack bag is arranged. If a bag to be filled is provided there, it will be filled only after the mold has been closed.

The method according to the invention furthermore allows to intentionally reinforce specific regions of the rim such as in particular the rim base or the braking flanks. The intentional reinforcing of the laminated band in the places which form the rim base or the rim flanges allows to realize a higher quality and value of the product as a whole. Since the laminated band is produced on the separate support, reproducibility will be considerably enhanced over the prior art. The achievable quality increases.

Those portions of the rim flanges protruding radially inwardly are preferably formed by means of the second laminated band. The layers of the second laminated band are preferably folded back 180° at the radially outwardly edge such that the radially inwardly protruding portions of the rim flanges are formed by means of folded back portions of the second laminated band. It is also possible to employ separate flange bands or fabric units for forming the inwardly protruding portions of the rim flanges.

It is particularly preferred to employ beneath the outwardly facing braking flange, an indicator layer which is set off e.g. optically from the other layers. It is e.g. possible to work in differently colored fibers such that as the braking layer has worn down the approaching end of the service life is noticeably indicated to the user. The braking layer employed preferably includes glass fiber reinforcements while the other layers consist of carbon fiber materials or the like. The different reflection characteristics of the glass fiber and the woven carbon layers already notify the user when the actual braking layer is abraded such that the rim needs replacing.

Two rim well rings are preferably provided which are inserted one by one wherein in particular after inserting the two rim well rings a spreader ring is inserted between the two rim well rings to thus laterally press the material in the region of the upper rim flanks and the rim flanges. The applied pressure causes the material to distribute accordingly with the air caught in the fabric being pressed out by means of the liquid resin.

In preferred embodiments the rim flanges form part of the rim flanks, specifically the radially outwardly portions of the rim flanks at the outside of which the braking surfaces are provided.

De-molding the rim occurs in particular after a cooling step.

In a preferred specific embodiment of the invention the basic mold consists in particular of two halves which are connected with one another before the first laminated band is inserted. The two axially abutting halves are in particular screwed to one another.

In an advantageous specific embodiment of the invention, at least one fiber strand or a woven strip is lengthwise centered on the first laminated band to thus reinforce the intended rim base.

This allows to produce a more homogeneous rim by way of allowing a more reliable and warp-free positioning of the first laminated band on the mold base, and since by way of the fiber strand or the woven strip a reinforcement of the rim base is moreover obtained for the intended accommodation of the spoke nipples.

The fiber strand additionally reinforces the effect already obtained by way of the second quantity of strips, in particular if the second quantity of strips is narrower in width than the first quantity, which is preferably the case.

Further embodiments may provide that aside from the first quantity of strips and the second quantity of strips, a third, fourth, and fifth quantity of strips are stacked upon one another to form the first or the second multi-layer laminated band. In this way, employing a number of narrow strips allow to reinforce the radially inwardly region of the rim base and to achieve a warp-free positioning of the laminated band in the mold base, so as to considerably increase the quality and reproducibility of the rims produced according to the invention.

In conventional production methods the draping of the layers in the basic mold tends to cause the prefabricated fabrics to locally warp which leads to local weakening of the rim which in turn reduces the local stress tolerance which decreases the reproducibility of production and the quality.

Preferred specific embodiments of the invention employ a fiber strand with fibers aligned in parallel or a roving. In this way a precise positioning of the laminated band is achieved in the center region of the rim at the radially inwardly edge of the rim base.

In other preferred embodiments, a fiber strand of twisted fiber strands or a fiber netting is employed. Again, a reliable and particularly reproducible production of the rim is possible in this way.

According to a preferred specific embodiment of the invention the inventive method provides that before the second laminated band is inserted, at least another woven-fiber strip is positioned to reinforce the rim base. This more specific embodiment may be employed both in the case that a fiber strand is employed in a center region of the first laminated band, and in the case that no separate fiber strand is applied. In all of the cases, another woven-fiber strip reinforces the rim base. To achieve further reinforcement of the rim base, more than one or two woven-fiber strips may be positioned, e.g. 3, 4, 5, 6, or 10 or 20 or still more strips may be employed.

In an advantageous configuration of the method according to the invention the component parts of the basic mold are firstly interconnected and subsequently a release agent is applied on the shaping surface to prevent the rim to be produced from adhering to the basic mold.

Before the external ring is applied, any radially protruding material is preferably removed. What is in particular removed is any material protruding radially outwardly beyond the basic mold and the spreader ring and the rim well rings.

In a more specific embodiment of the invention the material is pressure-bonded in the region of the rim flanges which is achieved in particular by way of two radially inwardly protruding webs of the external ring protruding into the region of the rim flanges where they compact the material and thus achieve that the shape of the rim flanges does not require any refinishing.

The core used may be a closed film hose provided with a fluid junction through which the internal pressure in the film hose is increased as the mold is heated or tempered. The pressure in the film hose is increased only after mounting the external ring, such that the woven-carbon layers of the two laminated bands are pressed to the sides of the contour of the basic mold and to the inner contour of the basic mold.

In a preferred more specific embodiment of the invention the mold is temperature-controlled by way of integrated channels by means of at least one fluid which may be heated and/or cooled as needed. With the mold being heated and/or cooled by means of a liquid fluid such as oil or water, the basic shape can be heated particularly fast and cooled particularly fast in this way. It is conceivable to also provide, after temperature-controlling by way of integrated channels, electrical heating e.g. by way of resistance wires.

A suitable heating agent in particular for intended heating temperatures far above 100 degrees Centigrade is an oil while the mold is preferably cooled by way of water streaming through channels. This is highly advantageous since in this way a highly effective and very fast cooling is achieved. This is particularly advantageous since time is a considerable factor in the production costs due to the high proportion of manual labor. Cooling by way of integrated channels allows to save a considerable proportion of the time set aside for machining a rim since cooling requires a few minutes only.

A particularly preferred specific embodiment of the invention provides for the mold to be coated in a material comprising ceramic particles in a radially outwardly region of the shaping surface to firmly bond said coating with the rim flanks in curing such that the rim flanks serving as braking surfaces are provided with a special braking coating of ceramic particles or the like. Beneath the braking coating there is in particular arranged an indicator coating as mentioned above.

Other embodiments may provide that on the two side areas of the first laminated band, a coating specifically provided with ceramic particles is applied which is then firmly bonded with the other rim layers in the mold.

All of the embodiments of the invention preferably employ dry woven carbon fiber which in production is coated in a liquid resin to optimize the dispersion of the resin. It is also conceivable to employ pre-impregnated woven carbon fibers e.g. in the form of pre-pregs.

In the method according to the invention preferably at least one transverse web is inserted between the rim well and the rim base.

All of the specific embodiments may provide for at least one spoke hole reinforcing layer to be inserted which is matched in shape to the spoke holes by way of providing e.g. oval, round, square or polygon reinforcing points connected by means of thin webs or the like.

Advantageously at least one tread wear indicator layer is inserted at the rim flanks to indicate the end of service life.

All of the embodiments may provide for at least one thermoplastic material to be employed. Thermoplastic matrix materials offer the advantage to have a nearly unlimited shelf life, they can be reversibly plasticized at high temperatures and e.g. can be fused.

In other preferred embodiments of the invention the matrix material consists at least in part of a thermosetting material.

The inventive rim according to claim 17 is in particular suitable to be used with a bicycle and comprises a rim well, a rim base, lateral rim flanks and rim flanges, said rim being produced according to any of the production variants described above.

Another apparatus according to the invention for producing a rim from woven layers of fiber-reinforced materials is in particular suitable to produce bicycle rims for bicycles and comprises a mold. The bicycle rim comprises a rim well, rim flanks on which rim flanges are provided between which a tire can be accommodated. The mold comprises a basic mold having an annular groove which has the shape of the outer surface of the rim base and the rim flanks. For molding the rim well and the rim flanges, at least two rim well rings and at least one spreader ring are provided. According to the invention the spreader ring is configured wedge-shaped and is arranged between the rim well rings to pressure-bond the fabric layers at least in the region of the rim flanges.

The spreader ring is wedge-shaped in particular in the radial direction which wedge radially tapers inwardly. Preferably the spreader ring is configured approximately symmetrically relative to the plane of the spreader ring and at approximately equal inclination angles of the wedge surfaces on both sides. Preferably the rim well rings contacting the wedge-shaped surface of the spreader ring are configured in matched wedge shapes such that the wedge-shaped surfaces contacting one another are neutralized. By way of a radial pressure applied on the spreader ring the rim well rings are then axially forced apart such that the regions of the rim flanges or rim flanks are pressure-bonded.

Another inventive apparatus serves for producing a bicycle component from woven layers of a fiber-reinforced material and comprises a bicycle component mold. The bicycle component to be produced comprises a component body consisting of multiple fabric layers stacked upon one another and matched to the inner shape of the bicycle component mold. According to the invention the bicycle component mold is provided for accommodating a plurality of woven layers of a fiber-reinforced material, and the bicycle component mold comprises at least one channel to temperature-control the bicycle component mold by means of a fluid streaming through the channel.

Preferably such an apparatus according to the invention and the bicycle component mold serve for producing a bicycle rim or a suspension fork or for producing other bicycle components.

More specific embodiments of apparatuses according to the invention provide for at least one electric heating element at the mold.

In the case of heating or cooling by means of a fluid, a liquid is preferably provided.

The spreader ring preferably substantially consists of the same material as does the basic mold. In this way substantially equal pressure conditions will prevail during curing. What is important in this respect is, approximately the same coefficients of thermal expansion.

BRIEF DESCRIPTION OF THE DRAWINGS

Further advantages and features can be taken from the exemplary embodiments described below with reference to the enclosed Figures.

DETAILED DESCRIPTION

Figure 1:
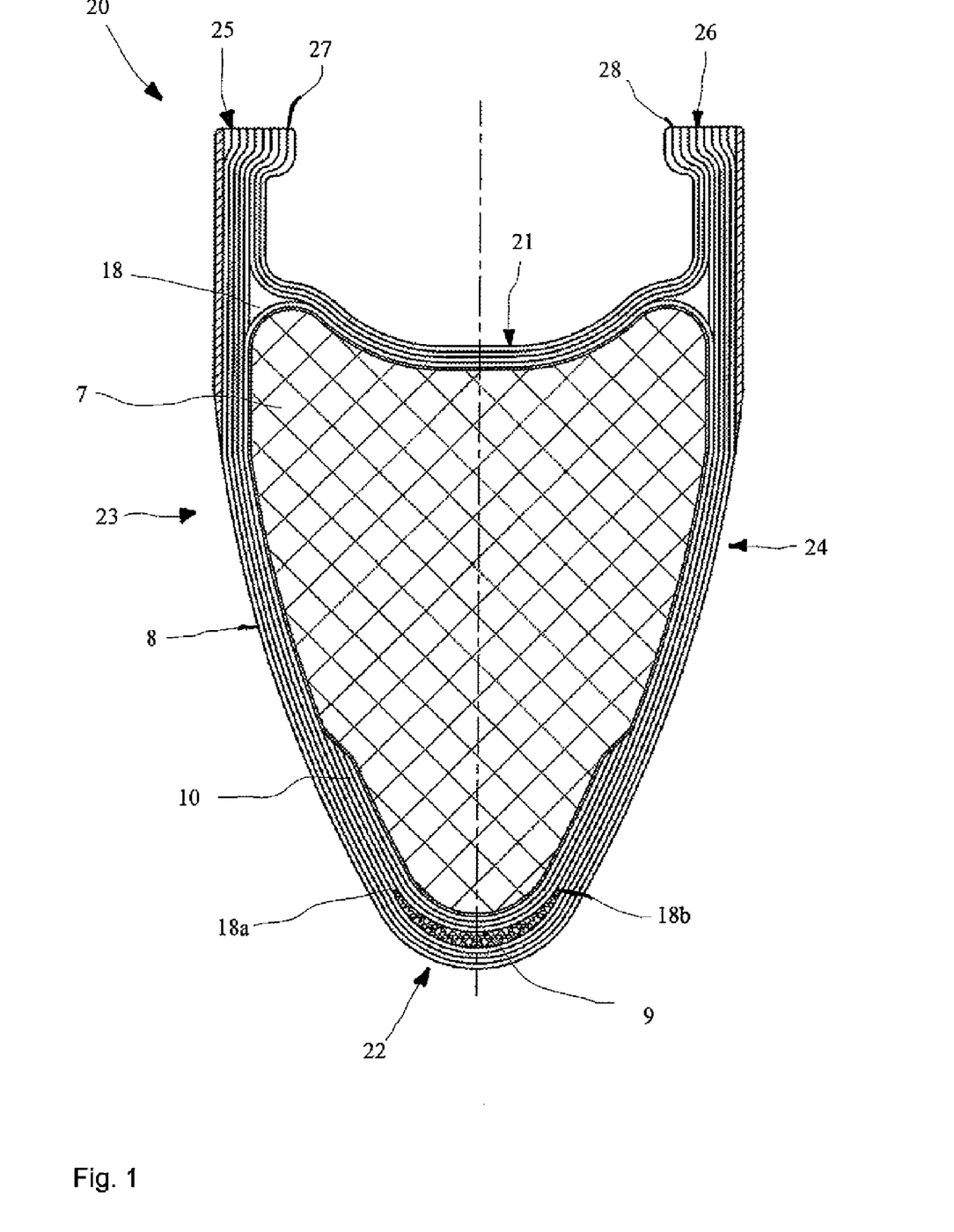
FIG. 1 is an inventive rim in section.
Figure 2:
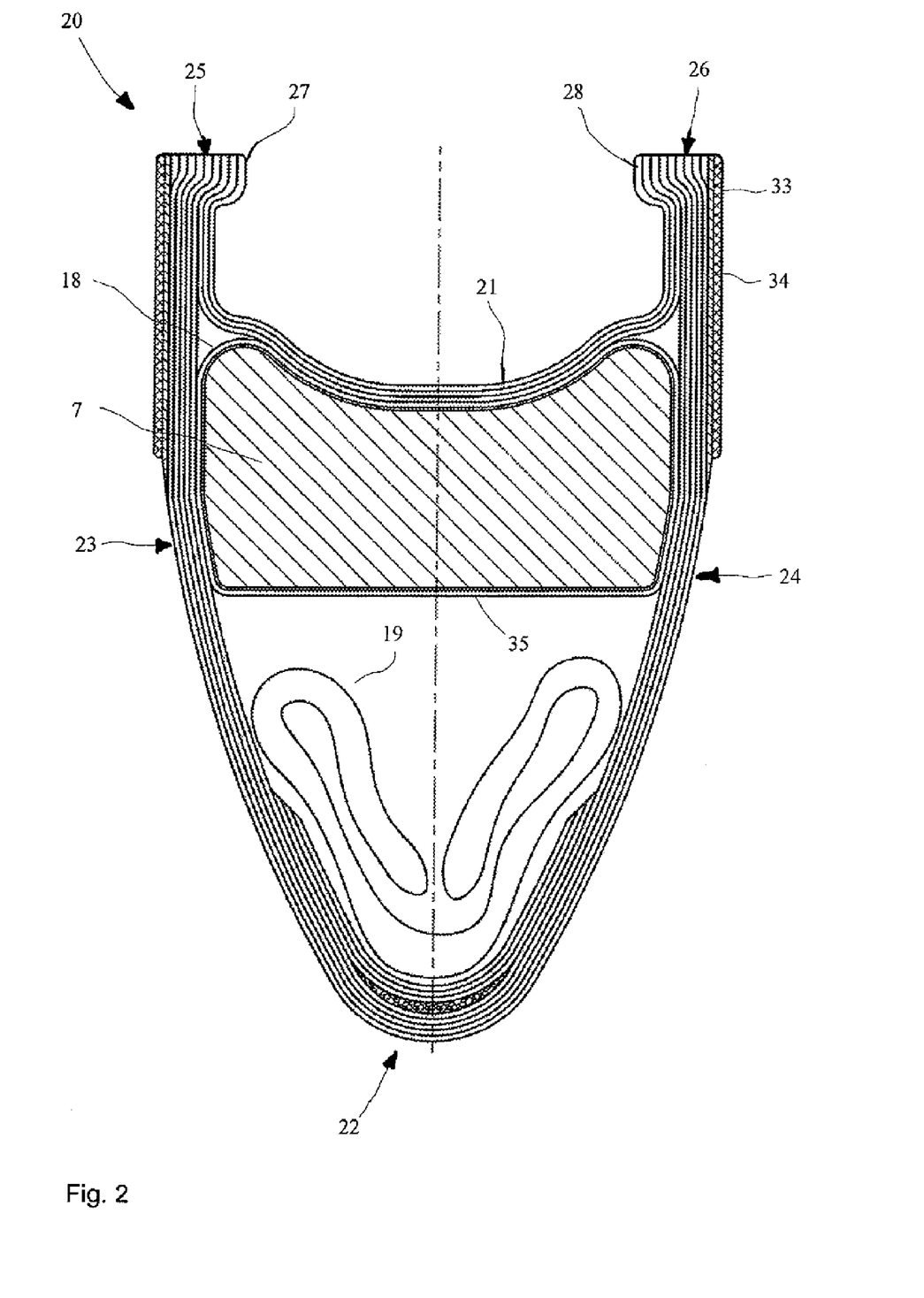
FIG. 2 is another inventive rim in section.
Figure 3:
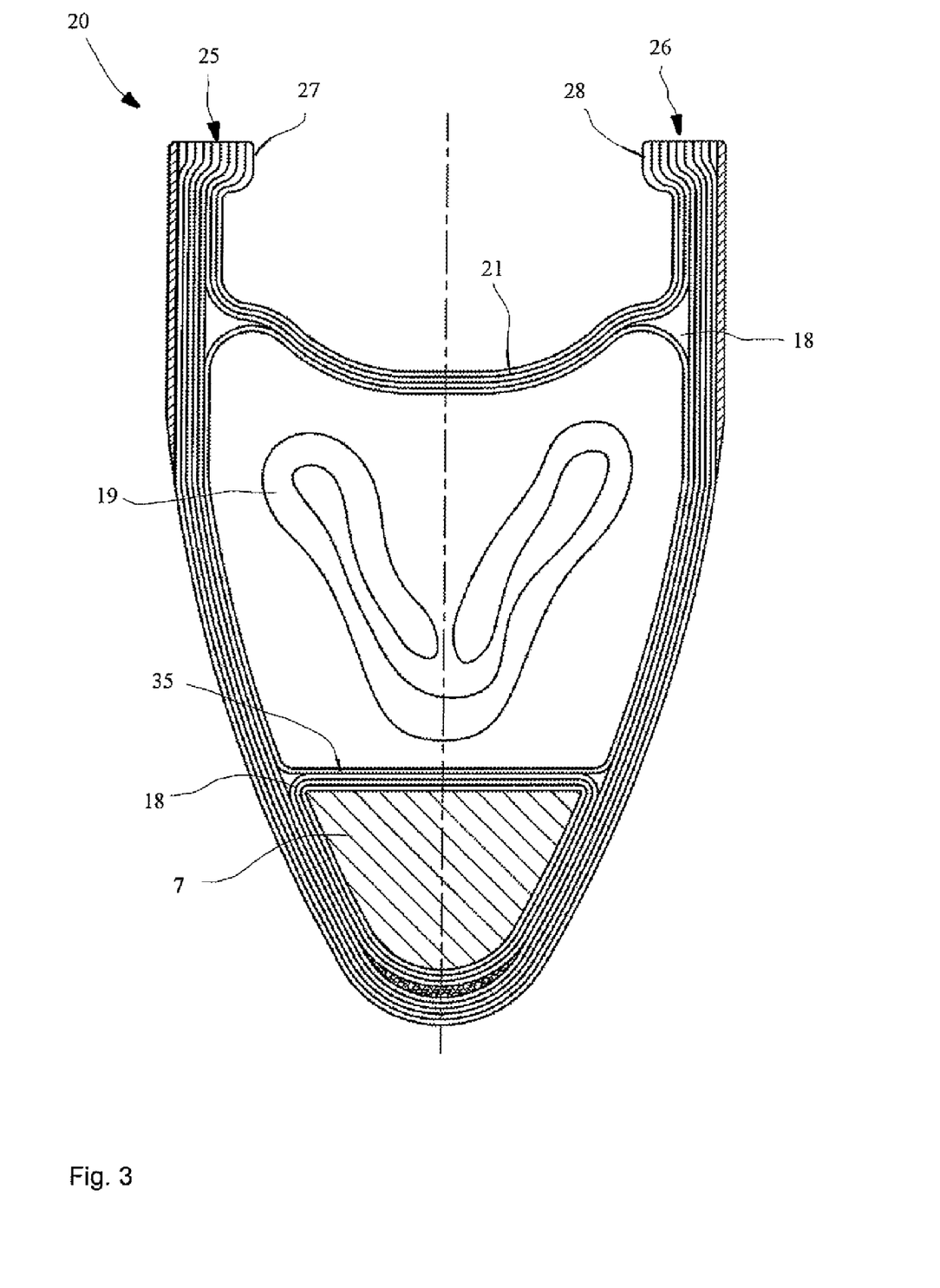
FIG. 3 is a third embodiment of the inventive rim.
Figure 9:
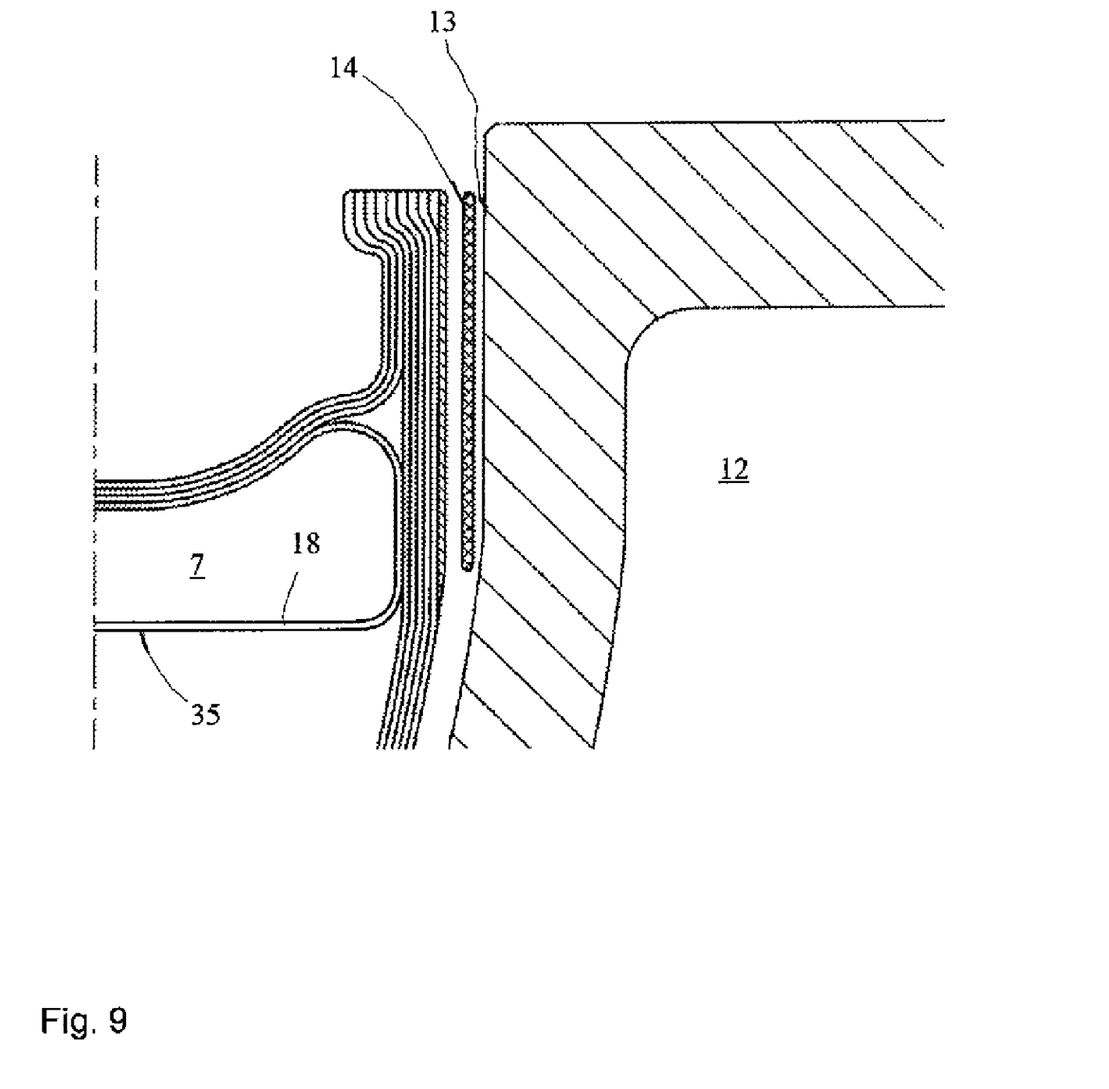
FIG. 9 is a variant of the inventive rim in section.

FIG. 1 illustrates a first embodiment of the invention while the FIGS. 2, 3, and 9 illustrate modified variants.

Figure 7:
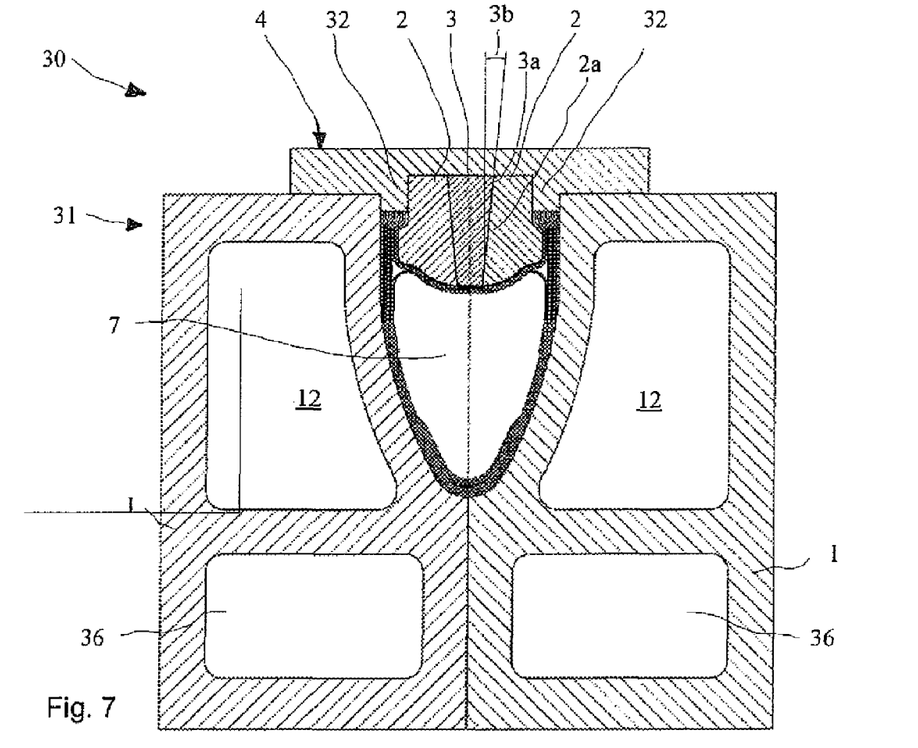
FIG. 7 is the apparatus according to the invention for producing an inventive rim in section.

The apparatus 30 illustrated in section in FIG. 7 serves for producing an inventive rim 20, comprising a basic mold 31 which includes two halves 1 which, for producing an inventive rim 20, are axially aligned with one another and screwed to one another. Thereafter a release agent 13 is applied on the shaping surface 32 of the mold 30 to prevent any rim parts from adhering to the mold.

Figure 8:
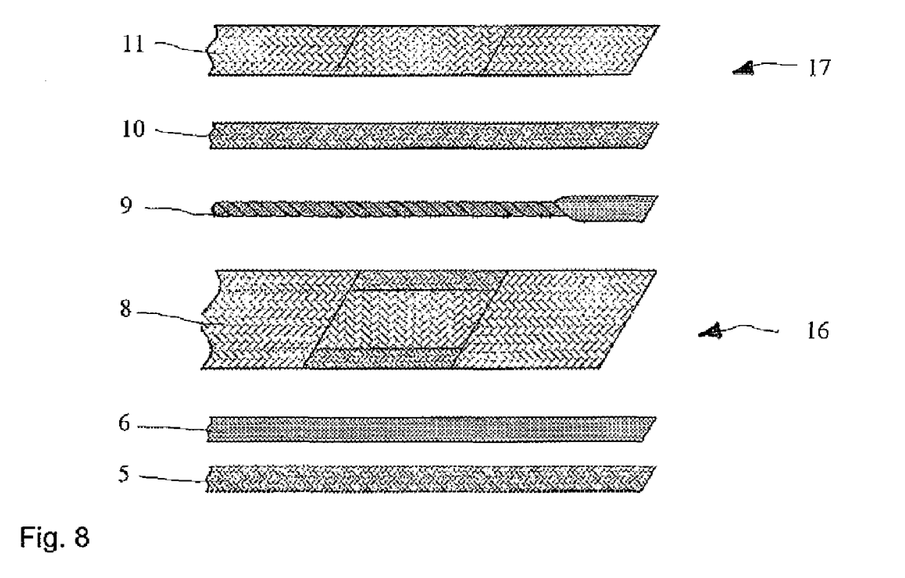
FIG. 8 is the different layers of the first and the second laminated bands.

Thereafter, woven carbon fibers are cut to different sizes as illustrated by way of the strips 5, 8 etc. in FIG. 8, unless they had been prefabricated. The woven carbon-fiber layers are carefully stacked upon each other in a defined pattern with each layer being precisely aligned relative to one another on the support.

The first laminated band 16 is formed of different layers comprising in the present embodiment firstly a narrow layer 5 of the carbon fiber material which is positioned on the support. The layer 5 may be e.g. 10 mm in width. Then, another, e.g. somewhat wider layer (e.g. 20 mm) may be positioned on the first layer, or a carbon tape 6 consisting of a plurality of carbon fibers aligned in parallel is positioned on the previously arranged layers to prevent the laminated band 16 from unintentional lengthening in the subsequent processing steps. When the rim is assembled as intended the layer 6 is positioned in the rim base to reinforce the bottom area 22. The layer 6 will ensure a reliable, warp-free positioning of the laminated band 16 on the radially inwardly mold surface.

After positioning a predetermined quantity of further layers 8 the first laminated band 16 is finished and ready to be inserted into the basic mold 31 of the apparatus or the mold 30 for producing the rim 20.

First, however, the laminated band 8 is pre-shaped into a V so as to increase stiffness against bending etc. The V-shaped, first laminated band 16 is inserted into the mold 30 against which it is pressed by means of auxiliary tools. For this purpose the mold 31 may be configured to be rotatable.

A cord 9 or a fiber strand may be positioned on the first laminated band 16 so as to ensure, additionally to reinforcing the rim base 22 for the intended accommodation of the spoke nipples, a reliable and warp-free positioning of the laminated band 16 on the bottom of the mold base to thus increase the reproducibility and quality of the produced rims.

For further reinforcing the rim base 22, one or more layers of another carbon fabric may be positioned on the cord 9.

A second, narrower laminated band is pre-laminated and pre-shaped into a U from additional woven carbon fiber strips cut to size. Said second, narrower laminated band 17 forms the rim well 21 and part of the rim flanges 25, 26 namely, their interior layers.

The inventive rim 20 illustrated in FIG. 1 comprises a core 7 which is enclosed in a core layer 18 which is in particular configured as a fabric hose. Or else it is conceivable to employ as the core layer 18 a fabric layer which is wrapped around or positioned on the expanded core 7. The ends 18a and 18b of the core layer may be provided in the region of the reinforcing fibers 9.

The core 7 may consist e.g. of a eutectic metal cast in a different pre-form in which to cool and solidify. The core ring which is e.g. slotted or the core 7 consisting of two parts may be enclosed in an additional protective coating, e.g. in a plastic film.

The matching, profiled core is placed in the mold, the second laminated band 17 is positioned on the core 7 to form the rim well and a portion of the flanks. The radially inwardly protruding portions 27, 28 of the rim flanges 25 and 26 are in particular formed by means of the layers of the second laminated band 17. The layers provided on the rim flanges are squashed in the production mold 30 in the direction of the rim base so as to obtain approximately the profile of the layers shown in FIG. 1 in the present embodiment.

After heating and curing the rim, the core 7 may be removed by way of melting the core material which is eutectic at corresponding temperatures and runs out of the rim in particular through the valve hole. The protective coating enclosing the core 7 can then be pulled out of the rim such that the core 7 is removed entirely residue-free. The collected material is then cast to form a new core which can be re-used later.

Alternatively the core 7 may consist of a foamed plastic such as a polystyrene foam which either remains in the rim or is flushed out with a solvent such that in this case the core can again be removed residue-free. To protect the carbon rim from the solvent, the foam core may e.g. be enclosed in a protective coating.

Other materials may be employed for the core material such as water-soluble polymers which are flushed out after curing the rim.

In the embodiment according to FIG. 2, a firm core 7 is inserted which partially fills the hollow space and is enclosed in a fabric hose or a core layer 18. In this way the bottom region of the core, in the present embodiment at approximately half the rim height, a transverse wall 35 is inserted in the rim which considerably contributes to laterally stabilizing the rim. In this way the stability of the rim is significantly enhanced in particular in view of the forces occurring in braking and in view of the leverage at which the wire tires act on the rim flanges.

In order to tightly pressure-join the layers provided beneath the core 7 in the region of the rim base the present embodiment is provided with a fillable film hose 19 which is inserted in the mold empty and is only filled up after closing the mold such that the transverse wall 35 is first positioned above the slack bag 7 without contacting it.

In the embodiment according to FIG. 3, a firm core 7 is provided in the region of the rim base which is enclosed in one or more layers 18. The layers 18 may be configured as fabric hoses or be wrapped or positioned around the core 7.

The remaining free space above the core 7 is filled up by way of another fabric layer or another fabric hose 18 which are pressed against the outer wall by means of a fillable hose 19. The fillable hose 19 is only filled up when the mold is closed. Again each transverse wall 35 forms a lateral rim reinforcement for the rim to better transfer the loads occurring in braking and the bending moments acting on the rim flanges due to the internal pressure of the wire tires.

Figure 4:
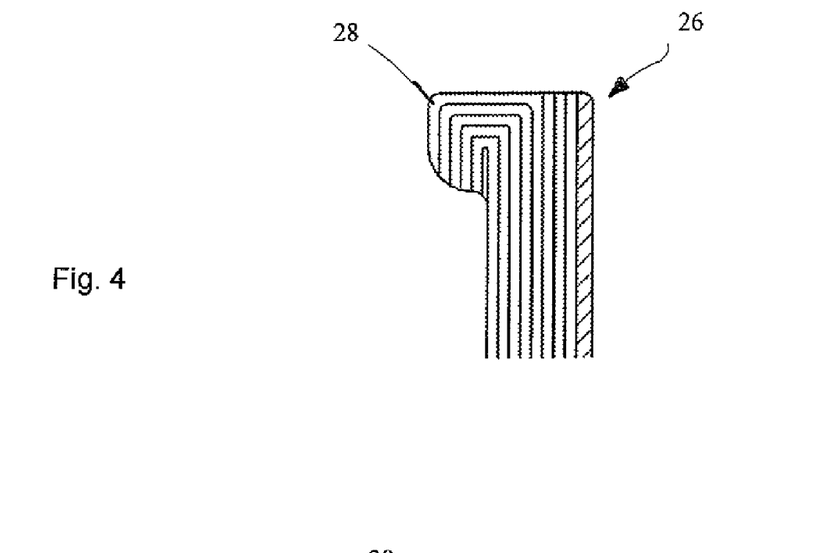
FIG. 4 is an alternative configuration of the rim flanges.

FIG. 4 illustrates an alternative configuration of the rim flanges. The extreme edges of the second laminated band 17 are folded back 180 degrees, thus forming the inwardly protruding projections 28 of the rim flanges 26.

Figure 5:
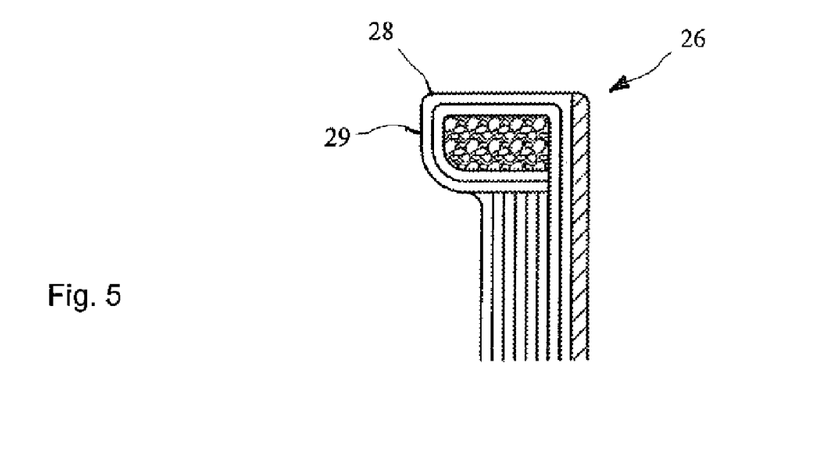
FIG. 5 is another optional embodiment of the rim flanges.

Alternatively, separate flange bands 29 may be employed as illustrated in FIG. 5. These flange bands 29 may consist of unidirectional reinforcing fibers enclosed in a fabric hose or a fabric layer. The flange bands can endure particularly high loads in the radial direction.

Figure 6:
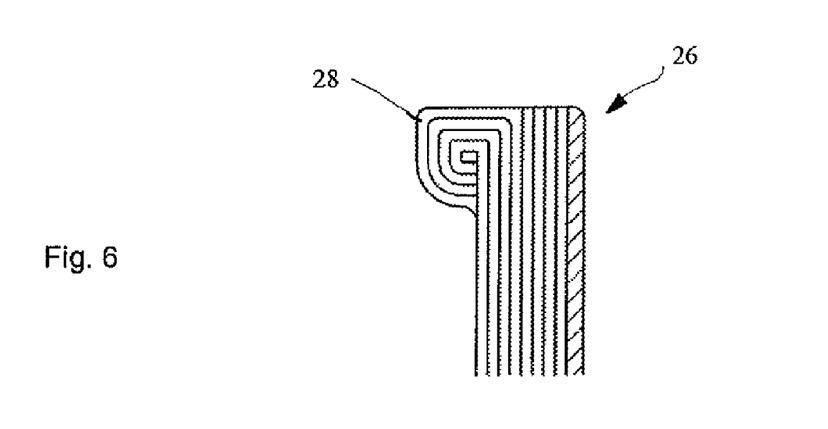
FIG. 6 is again, another configuration of the rim flanges.

In the configuration of the rim flanges 26 shown in FIG. 6 the extreme edges of the second laminated band 17 are wrapped or rolled up to form the inwardly protruding projections 28 of the rim flanges 26 ascending inwardly in a rounded curve.

In all of the cases the shape of the rim flanges is determined in the production mold so as to eliminate the need of trimming in finishing.

By way of closing the mold with the external ring 4, the embodiments according to FIGS. 1, 2 and 3 provide for the layers in the region of the rim flanges 25, 26 to be pressure-joined such that the section pattern formed by the layers approximately corresponds to the pattern illustrated in the FIGS. 1, 2 and 3.

Alternatively the rim flanges may be configured as in FIG. 4 where the edges of the layers of the second laminated band are folded back before positioning in the mold to form the inwardly protruding portions 27 and 28 of the rim flanges.

The two rim well tires 2 pre-treated with the release agent are drawn into the mold above the second laminated arrangement 17 and thereafter the spreader ring 3 is clamped between the two rim well rings 2. The wedge-shaped spreader ring 3 forces the rim well rings 2 apart and presses the layers of the rim flanks against the two halves 1 of the mold 30. The inclination angle of the side faces 2a of the rim well rings 2 correspondingly matches the inclination angle 3b of the side faces 3a of the spreader ring 3. The inclination angle 3b is basically arbitrary, in particular it lies between approximately 2° and 30°, preferably between 2° and 15°. Any material escaping in clamping is trimmed.

Thereafter the outer ring 4 is mounted wherein the two internal webs 32 of the outer ring 4 pressure-join the material in the region of the rim flanges 25, 26. Any fabric strips present in this place are squashed somewhat if necessary.

By way of clamping the spreader ring the woven-carbon layers or the two laminated bands 16 and 17 are pressed to the sides of the contour shape of the mold or to the interior sides of the rim tire.

The entire unit of the mold 30 and the inserted woven-carbon layers are subjected to a heating and cooling cycle so as to cause the woven carbon to cure. After cooling the rim 20 the outer ring 4 is opened and removed. Subsequently the spreader ring 3 is removed and any of the two rim well rings 2 is displaced toward the profile center such that it can be removed past the rim flange 25 or 26. The second rim well ring 2 is removed in a similar process.

After unscrewing, the two mold halves 1 of the master mold 30 can be separated and the rim removed.

The produced rim 20 comprises a rim well 21, a rim base 22, rim flanks 23 and 24 and rim flanges 25 and 26 and entirely consists of a fibrous composite material. In the sectional view of FIG. 1 one can clearly recognize in the region of the rim base, the fiber strand 9 and the reinforcing strips 10 for reinforcing the rim base. Although carbon fibers are in particular favored as reinforcing fibers, other suitable fiber materials are conceivable such as glass fibers, aramidic fibers, kevlar fibers and the like.

It is a considerable advantage that after de-molding the only finishing required for the rim is deburring. Any projecting resin tongues at the joints of the mold halves 1 of the master mold 30 are removed. No extensive reworking, trimming or shaping of the rims is required. The surface does not require any coating or other finishing.

Heating and cooling of the mold occurs by way of introducing a fluid such as oil or the like into the channels 12. Cooling may occur through the channels 12 or separate channels 36 through which water or oil is allowed to stream to allow the mold to cool quickly.

The variant of the inventive rim illustrated in FIG. 2 is different among other things in that a ceramic coating 33 is applied on the outer side surfaces in the upper area of the rim flanks which serve as braking surfaces. Beneath the ceramic coating 33 a tread wear indicator coating 34 is provided. As the ceramic coating 33 wears away, the tread wear indicator coating 34 becomes visible for the user to realize that the rim is nearing the end of its service life.

In the embodiment according to FIG. 9 the basic mold 31 is coated in a release agent 13 and provided with a friction-enhancing coating 14 which forms or reinforces the braking coating. Beneath the braking coating, a tread wear indicator coating may be provided.

The invention claimed is:

1. A method of producing a rim in particular for bicycles comprising a rim well, a rim base and rim flanks connecting the rim well with the rim base, and rim flanges between which a tire can be accommodated, comprises the following steps:
   positioning on a separate support at least a first quantity of strips of a woven-fiber including material which said first quantity of strips comprises a first shape, a first width and a first length;
   positioning on the support at least a second quantity of strips of the woven-fiber including material which said second quantity of strips has a second shape different from the first shape, to form from said first quantity and at least said second quantity of strips, a first multi-layer laminated band;
   producing a second multi-layer laminated band which is narrower than the first laminated band;
   re-shaping the substantially first laminated band into a V-shaped laminated band;
   inserting the V-shaped first laminated band along the periphery of the inner part of a basic mold;
   positioning a core on the first laminated band in the basic mold;
   positioning the second laminated band on the core;
   inserting from outside at least a first and at least a second substantially annular rim well ring on the second laminated band, which rim well rings abut the sides of the second laminated band;
   inserting a wedge-shaped spreader ring between the rim well rings to pressure-join the material in the region of the upper rim flanks and the rim flanges;
   positioning an outer ring;
   heating up the mold and temperature-controlling for a predetermined duration at predetermined temperature conditions; and
   removing the rim.

2. The method according to claim 1, wherein the basic mold consists of two halves which are connected with one another before the first laminated band is inserted.

3. The method according to claim 1, wherein a fiber strand is lengthwise centered on the first laminated band to reinforce the rim base.

4. The method according to claim 3, wherein the fiber strand is twisted before positioning.

5. The method according to claim 1, wherein before inserting the second laminated band at least one more strip of the woven fiber is positioned to reinforce the rim base.

6. The method according to claim 1, wherein firstly the mold parts of the basic mold are connected with one another and subsequently a release agent is applied on the shaping surface.

7. The method according to claim 1, wherein before applying the external ring any radially protruding material is removed.

8. The method according to claim 1, wherein two radially inwardly webs of the external ring pressure-join the material in the region of the rim flanges.

9. The method according to claim 1, wherein the core is filled with a fluid.

10. The method according to claim 1, wherein the mold is temperature-controlled through integrated channels by means of at least one fluid.

11. The method according to claim 10, wherein the mold is heated up at least in part by means of an oil.

12. The method according to claim 10, wherein the mold is cooled by means of water.

13. The method according to claim 1, wherein the mold is coated in a material comprising ceramic particles in a radially outwardly region of the shaping surface to provide at least part of the rim flanks serving as braking surfaces with a braking coating of ceramic particles.

14. The method according to claim 1, wherein at least one transverse web is inserted between the rim well and the rim base.

15. The method according to claim 1, wherein at least one spoke hole reinforcing layer is inserted.

16. The method according to claim 1, wherein at least one tread wear indicator layer is inserted at the rim flanks.

17. The method according to claim 1, wherein at least one core of a eutectic metal is employed.

18. The method according to claim 1, wherein the core is flushed out or dissolved.

19. The method according to claim 1, wherein at least one core is filled with water or oil and connected with a pressure-compensating valve to equalize the pressure during heating.

20. The method according to claim 1, wherein the matrix material employed is a thermoplastic matrix material at least in part.

21. The method according to claim 1, wherein the matrix material employed is a thermosetting matrix material at least in part.

* * * * *